(12) United States Patent
Chung et al.

(10) Patent No.: US 12,123,469 B2
(45) Date of Patent: Oct. 22, 2024

(54) BRAKE DISK AND METHOD FOR MANUFACTURING THE SAME

(71) Applicants: Hyundai Motor Company, Seoul (KR); Kia Motors Corporation, Seoul (KR)

(72) Inventors: Min Gyun Chung, Gyeonggi-do (KR); Jai Min Han, Gyeonggi-do (KR); Yoon Joo Rhee, Gyeonggi-do (KR); Byung Chan Lee, Gyeonggi-do (KR); Jae Young Lee, Gyeongsangbuk-do (KR); Yoon Cheol Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 903 days.

(21) Appl. No.: 17/184,090

(22) Filed: Feb. 24, 2021

(65) Prior Publication Data

US 2021/0190158 A1    Jun. 24, 2021

Related U.S. Application Data

(62) Division of application No. 15/837,301, filed on Dec. 11, 2017, now abandoned.

(30) Foreign Application Priority Data

Sep. 5, 2017 (KR) .......................... 10-2017-0113501

(51) Int. Cl.
F16D 65/12     (2006.01)
F16D 65/00     (2006.01)
F16D 65/02     (2006.01)

(52) U.S. Cl.
CPC ....... *F16D 65/127* (2013.01); *F16D 65/0006* (2013.01); *F16D 65/125* (2013.01);
(Continued)

(58) Field of Classification Search
CPC ........... F16D 65/12; F16D 65/123–128; F16D 65/0006; F16D 2065/1312; F16D 220/0013; F16D 2250/003; F16D 2250/0007
(Continued)

(56) References Cited

U.S. PATENT DOCUMENTS

2009/0090436 A1\* 4/2009 Chenoweth .......... C21D 9/0075
                                                                    148/557
2019/0072145 A1   3/2019 Chung et al.

FOREIGN PATENT DOCUMENTS

CN       101063471 A      10/2007
CN       101418413 A  *   4/2009  ............... B22D 1/00
(Continued)

OTHER PUBLICATIONS

Extended European Search Report for European Application No. 17206413, dated Jul. 13, 2018, 8 pages.
(Continued)

*Primary Examiner* — Christopher P Schwartz
(74) *Attorney, Agent, or Firm* — Fox Rothschild LLP

(57) ABSTRACT

Disclosed are a brake disk and a method for manufacturing the same. In particular, the brake disk may include a friction surface formed of cast iron, and the friction surface of the brake disk is divided into a plurality of sections in a circumferential direction. Preferably, an average of the numbers per unit area of eutectic cells formed on surfaces of the sections may not be greater than 300 ea/cm$^2$.

3 Claims, 7 Drawing Sheets

(52) U.S. Cl.
CPC ............... *F16D 2065/1312* (2013.01); *F16D 2200/0013* (2013.01); *F16D 2250/0007* (2013.01); *F16D 2250/003* (2013.01)

(58) Field of Classification Search
USPC .......................................... 188/18 A, 218 XL
See application file for complete search history.

(56) References Cited

FOREIGN PATENT DOCUMENTS

| | | | | |
|---|---|---|---|---|
| CN | 101643877 A | 2/2010 | | |
| CN | 103290301 A | 9/2013 | | |
| CN | 103348157 A | 10/2013 | | |
| JP | 8326803 | * 12/1996 | ............. | F16D 65/12 |
| JP | 2003053516 A | * 2/2003 | ............. | F16D 65/12 |
| JP | 2003121395 A | * 4/2003 | | |
| KR | 2006-0040391 A | 5/2006 | | |
| KR | 10-2009-0024859 A | 3/2009 | | |
| KR | 101499125 B1 | 3/2015 | | |
| KR | 10-1610131 B1 | 4/2016 | | |

OTHER PUBLICATIONS

Notice of Allowance issued Dec. 29, 2022 in Korean Patent Application No. 10-2017-0113501.

* cited by examiner

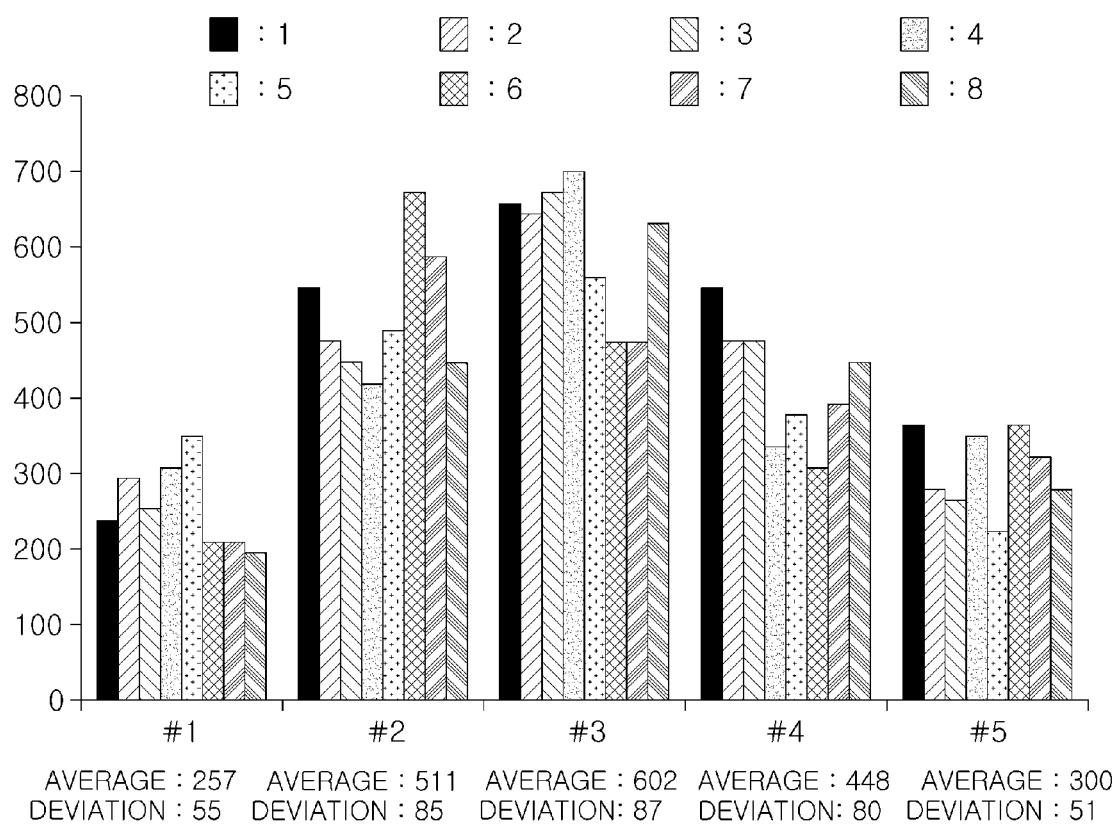

BRAKE DISK AND METHOD FOR MANUFACTURING THE SAME

CROSS REFERENCE TO RELATED APPLICATION

This Application is a Divisional of U.S. application Ser. No. 15/837,301 filed on Dec. 11, 2017, which claims priority of Korean Patent Application No. 10-2017-0113501 filed on Sep. 5, 2017, the entire contents of which is incorporated herein for all purposes by this reference.

TECHNICAL FIELD

The present invention relates to a brake disk including a friction surface formed of cast iron and a method for manufacturing the same.

BACKGROUND OF THE INVENTION

When a brake is used to brake a driving vehicle, the speed of the vehicle decreases as a brake torque increases. However, when the brake torque increased during the braking does not maintain a constant level, but vibrates while repeatedly increasing/decreasing, a judder phenomenon occurs in which such vibration is transferred to a passenger.

FIG. 1 illustrates a vibration phenomenon of a brake torque during braking, which may result in the judder phenomenon. A maximum brake torque vibration (BTV) is defined as a height difference between an uppermost end and a lowermost end of a section near a maximum point of the brake torque, as the brake torque repeatedly increases and decreases.

As such, a maximum BTV increases, the magnitude of vibration transferred to the passenger may increase, and the judder phenomenon may become stronger. Thus, the maximum BTV may be reduced to prevent or reduce the judder phenomenon.

In the related art, factors generally considered to reduce the maximum BTV include the shape, the thermal capacity, and the hardness deviation of a brake disk, whether the brake disk is corroded or not, a material of a friction material of the brake disk, and the like. However, even when the other conditions are almost the same, if a method for casting the brake disk is changed, the maximum BTV greatly may vary.

Thus, required are a brake disk having consistent physical properties to reduce the maximum BTV generated in the brake disk, and a method for manufacturing the same.

The matters described as the background art have been provided only for assisting in the understanding for the background of the present invention and should not be considered as corresponding to the related art known to those skilled in the art.

SUMMARY OF THE INVENTION

In preferred aspects, the present invention provides a brake disk which may reduce a judder phenomenon by a high BTV, and a method for manufacturing the same.

In one aspect, provided is a brake disk including a friction surface formed of cast iron. The friction surface of the brake disk may include a plurality of sections in a circumferential direction, and an average of numbers per unit area of eutectic cells formed on surfaces of the sections may not be greater than about 300 ea/cm$^2$.

The term "eutectic cell" or "eutectic cells" as used herein refers to a solidified particle or spherical or near spherical structure that may be formed in a cast iron or iron-carbon material. A typical eutectic cell may have a size (e.g., diameter or longest cross-section) greater than about 580 μm, greater than about 590 μm, greater than about 600 μm, greater than about 650 μm or greater than about 700 μm. In certain embodiments, a eutectic cell may have a size (e.g., diameter or longest cross-section) of less than about 10,000 μm, less than about 5,000 μm or less than about 3,000 μm. Preferably, a deviation or difference of numbers per unit area of the eutectic cells formed in the plurality of sections may be not greater than 60 ea/cm$^2$. The term "deviation" as used herein may refer to a change between the number of eutectic cells in a certain area unit (e.g., cm$^2$) and the average value of the number of cells in the unit.

In other preferred aspect, provided is a method for manufacturing a brake disk. The method may include casting the brake disk including a friction surface formed of cast iron, and grinding the friction surface of the brake disk in a thickness direction such that a number per unit area of eutectic cells formed on the friction surface of the brake disk is not greater than about 300 ea/cm$^2$.

In the grinding of the friction surface of the brake disk in the thickness direction, when an average contraction ratio at which the brake disk is contracted in the thickness direction while the brake disk is casted is less than about 1.5% or 2.5%, one side of the friction surface may be ground by a degree that is not less than about 2 mm and is less than 3 mm.

The term "contraction ratio" as used herein refers to a ratio of shrinking relative to the original value, for example, in the thickness direction of the brake disk, during a casting process.

In the grinding of the friction surface of the brake disk in the thickness direction, when an average contraction ratio at which the brake disk is contracted in the thickness direction while the brake disk is casted may not be less than about 1.5%, one side of the friction surface may be ground by about 3 mm or greater.

Further provided is a vehicle that includes the brake disc as described herein.

Other aspects of the invention are discussed infra.

A brake disk manufactured by the methods according to the present invention may reduce a judder phenomenon by reducing a maximum BTV through a relatively simple process, and improve motional quality for a passenger by reducing the judder phenomenon. In addition, occurrence of the judder phenomenon may be predicted based on the number per unit area of eutectic cells observable at a low magnification.

BRIEF DESCRIPTION OF THE DRAWINGS

The above and other objects, features, and advantages of the present invention will be more clearly understood from the following detailed description taken in conjunction with the accompanying drawings, in which:

FIG. 8 is a graph depicting numbers of exemplary eutectic cells formed on friction surfaces of exemplary brake disks with different casting methods and different grinding amounts according to an exemplary embodiment of the present invention.

DETAILED DESCRIPTION

The terminology used herein is merely for mentioning a specific embodiment, and is not intended to limit the present invention. A singular form used herein includes a plural form as long as the word does not indicate obviously the opposite meaning. The term "include" used in the specification specifies specific characteristics, an area, an essence, a step, an operation, an element, and/or a component, and does not exclude existence or addition of other specific characteristics, an area, an essence, a step, an operation, an element, a component and/or a group.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although not differently defined, all terms including the technical term and the scientific term used herein have the same meaning as the meaning that is understood by those skilled in the art to which the present invention pertains. The terms defined in a generally used dictionary are additionally interpreted to have the meaning matched with the related art document and currently disclosed contents, and are not interpreted to have an ideal meaning or a very formal meaning as long as the terms are not defined.

Hereinafter, a brake disk and a method for manufacturing the same according to an exemplary embodiment of the present invention will be described with reference to the accompanying drawings.

In one aspect, the brake disk according to the present invention will be described below.

The brake disk may include a friction surface formed of cast iron. A friction surface of the brake disk my include a plurality of sections in a circumferential direction, and an average of the numbers per unit area of eutectic cells formed on surfaces of the sections may not be greater than about 300 ea/cm$^2$.

Figure 1:
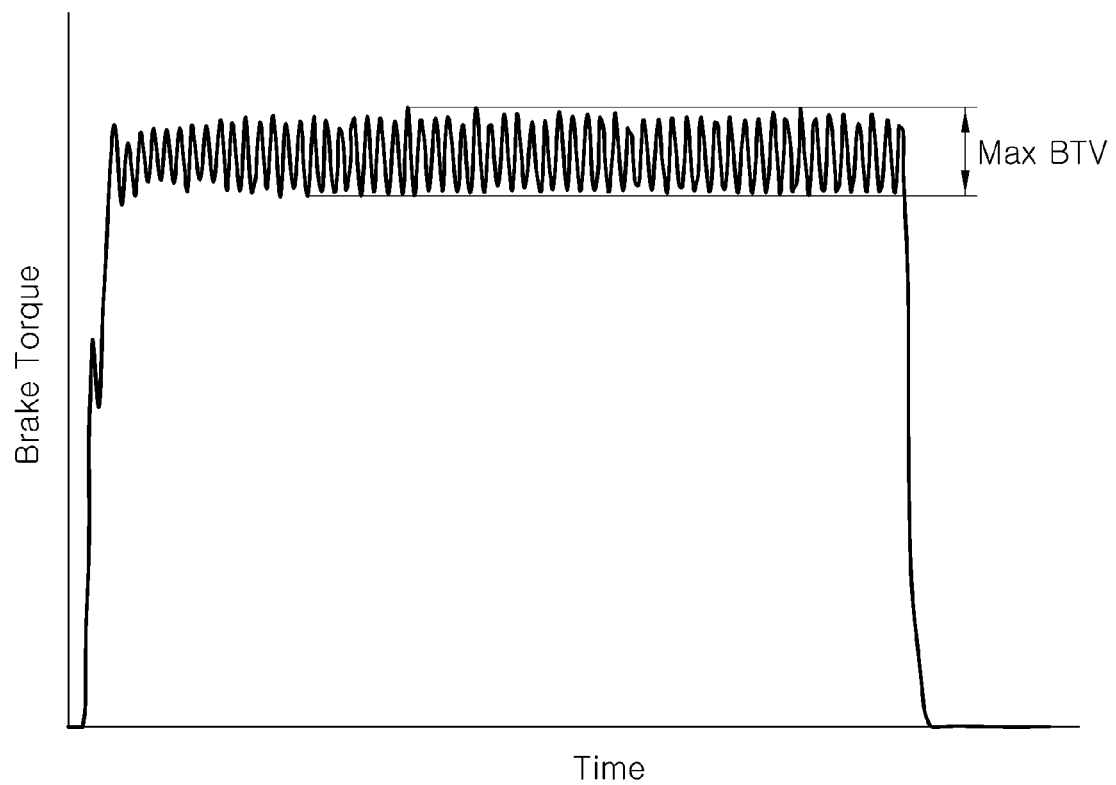
FIG. 1 is a graph depicting a state in which vibration of a brake torque is generated during braking in the related art.
Figure 2:
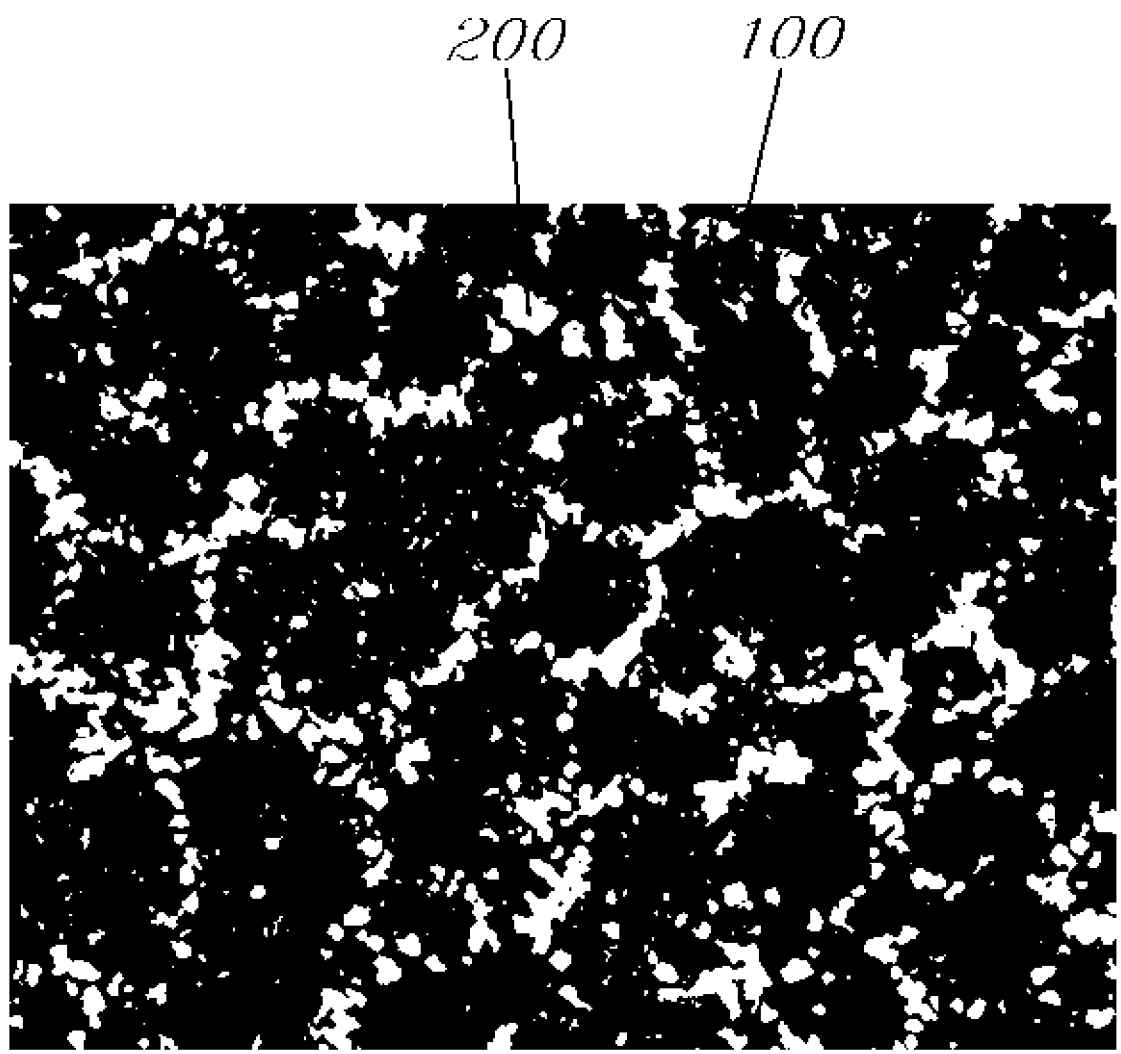
FIG. 2 illustrates an exemplary eutectic cell tissue formed on a surface of an exemplary brake disk according to an exemplary embodiment of the present invention.
Figure 3:
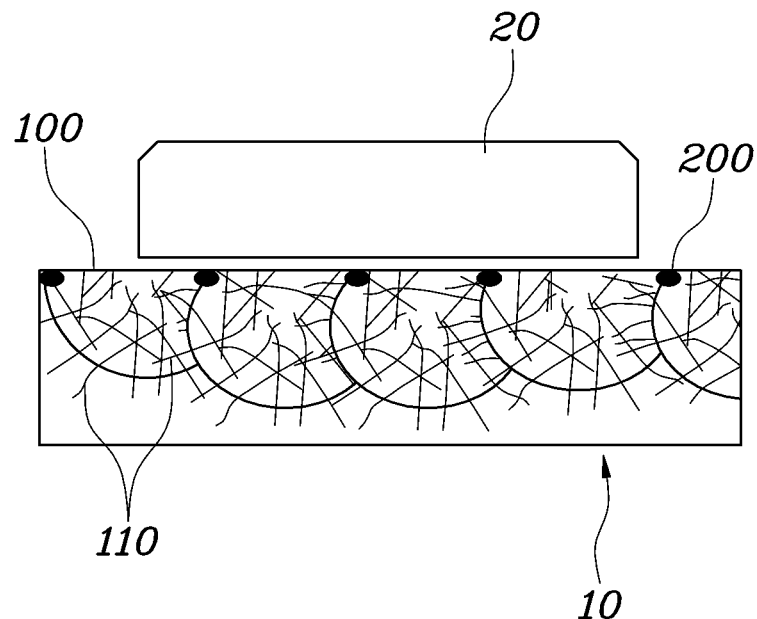
FIGS. 3 and 4 illustrate various amount of generated iron carbide depending on the size of a eutectic cell according to an exemplary embodiment of the present invention.
Figure 4:
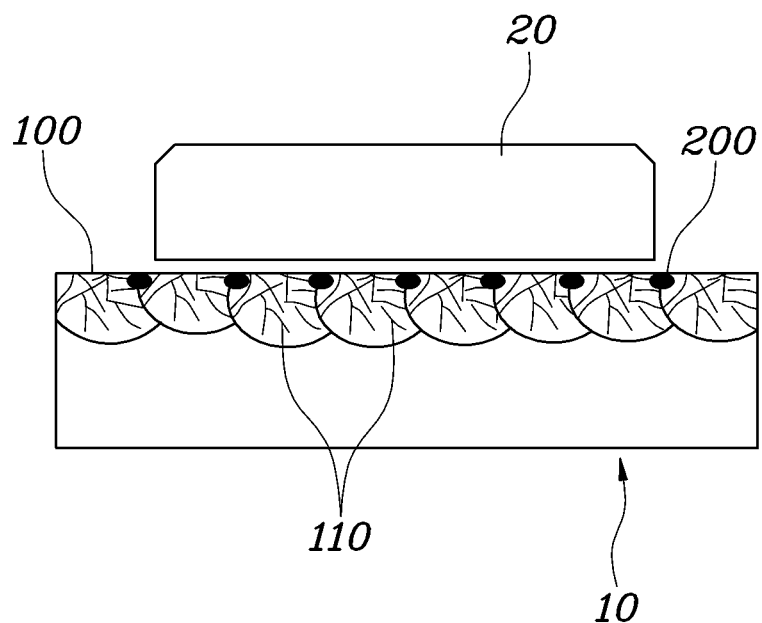

As illustrated in FIGS. 2 to 4, eutectic cells 100 may be formed in a brake disk 10 formed of cast iron. The eutectic cells 100 may be tissues which are grown to be similar to a spherical shape as a whole. The eutectic cells may be formed by clumping a plurality of plate-shaped graphites 110 and in which ferrite is formed in a space between the graphites 110, and iron carbides 200 such as Fe$_3$C are formed at boundaries of the eutectic cells 100.

Although the eutectic cells 100 are tissues that are commonly found in cast iron manufactured through a general casting process, a friction coefficient of the eutectic cells 100 may greatly vary depending on the sizes of the eutectic cells 100, in other words, a difference in the number per unit area of the eutectic cells 100 may be in various ranges.

Figure 5:
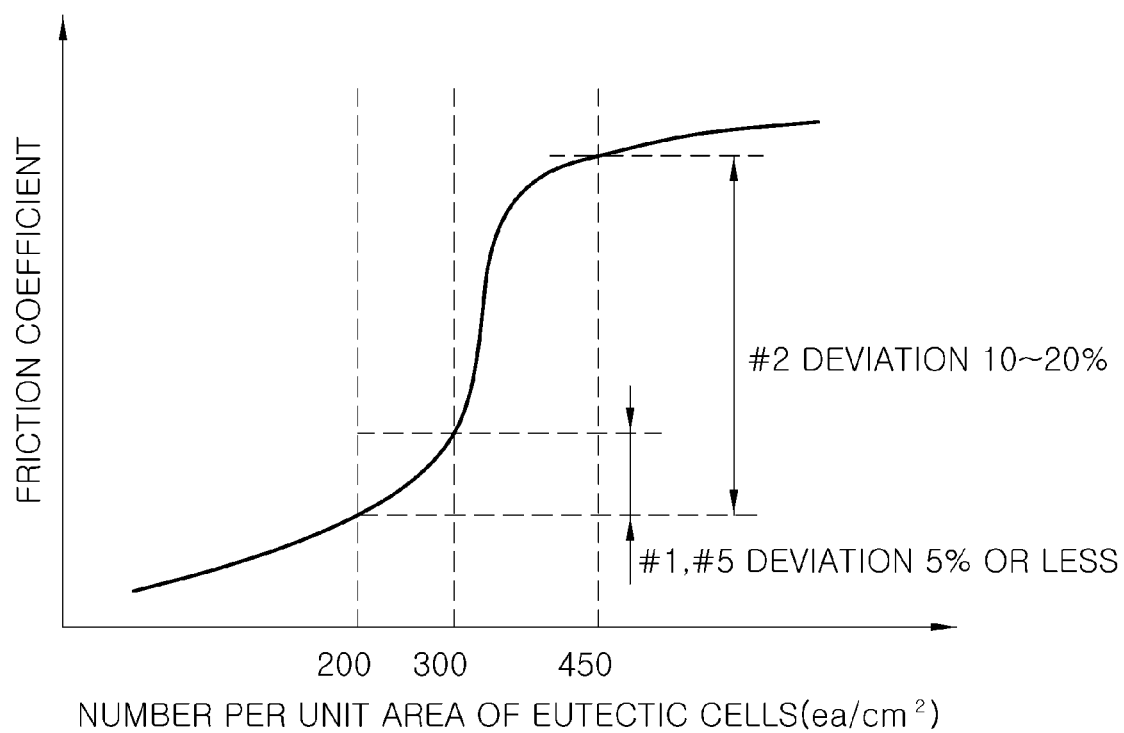
FIG. 5 is a graph depicting a change in a friction coefficient according to the number per unit area of eutectic cells according to an exemplary embodiment of the present invention.

As illustrated in FIG. 5, with an increase in the number per unit area of the eutectic cells 100, the friction coefficient gradually may increase. At this time, the friction coefficient may increase sharply when the number per unit area of the eutectic cells 100 is not less than about 300 ea/cm$^2$. When the number per unit area of the eutectic cells 100 is less than about 300 ea/cm$^2$, the friction coefficient may be reduced and a variation of the friction coefficient may not be increased. However, when the number per unit area of the eutectic cells 100 is greater than about 300 ea/cm$^2$, a deviation of the friction coefficient may increase as the friction coefficient increases sharply.

When the number per unit area of the eutectic cells 100 is within the predetermined range, for example, about 200-300 ea/cm$^2$, due to the growth of the graphites 110, lubricating films may be formed increasingly on a friction surface of the brake disk 10. Further, because abrasive wear is reduced as the number and the total area of the iron carbides 200 formed at the boundaries of the eutectic cells 100 are reduced, the overall friction coefficient may be reduced.

On the other hand, when the number per unit area of the eutectic cells 100 increases, or alternatively, when the sizes of the eutectic cells 100 decreases, because the graphites 110 do not increase, lubricating films may not be formed sufficiently on the friction surface of the brake disk 10. Further, because abrasive wear is caused as the number and the total area of the iron carbides 200 formed at the boundaries of the eutectic cells 100 increase, the overall friction coefficient may increase.

Figure 6:
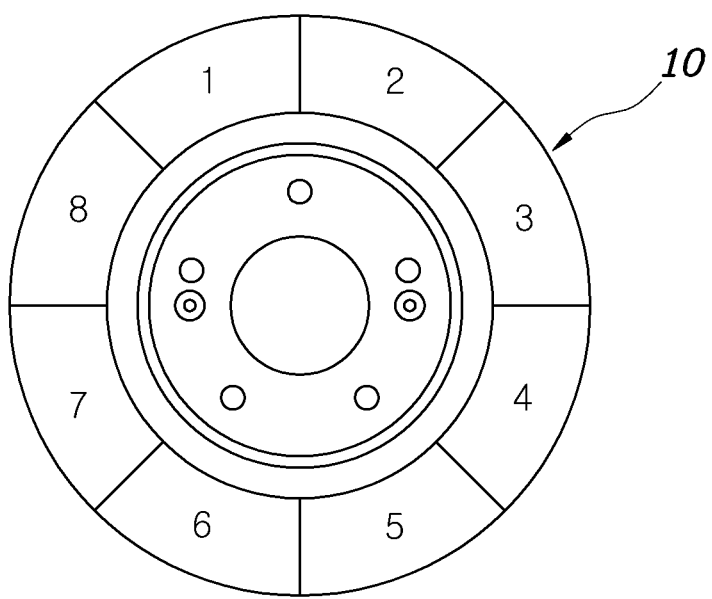
FIG. 6 illustrates an exemplary friction surface of the brake disk including a plurality of sections according to an exemplary embodiment of the present invention.

As illustrated in FIG. 6, after a circumference of the brake disc 10 is divided into several sections, when an average of the numbers of eutectic cells, which are measured in the sections, is not greater than about 300 ea/cm$^2$, the friction coefficient may be minimized.

In addition, a deviation of the numbers of the eutectic cells formed in the sections of the brake disk 10 may suitably not be greater than about 60 ea/cm$^2$.

Even when the average of the numbers of the eutectic cells formed in the brake disk 10 is not greater than about 300 ea/cm$^2$, when the deviation according to positions is increased, a deviation of the friction coefficient may be increased. Thus, in order to minimize the deviation of the friction coefficient, the deviation of the numbers of the eutectic cells of the brake disk 10 according to positions may be suitably about 60 ea/cm$^2$ or less.

When the deviation of the friction coefficient of the brake disk 10 according to positions is reduced, the maximum BTV generated due to the deviation of the friction coefficient may be also reduced. Through this, vibrations generated during braking may be minimized by ultimately reducing a judder phenomenon.

Because any material may be applied to the above-described brake disk 10 as long as the material is cast iron generally applied to a friction part of a brake disk, the material is not specifically limited. For example, a commercial material such as FC200 may suitably be used as the material.

Further provided is a method for manufacturing a brake disk. The method may include casting a brake disk including the friction surface formed of cast iron, and adjusting the number per unit area of eutectic cells formed on the friction surface of the brake disk to be about 300 ea/cm² or less by grinding the friction surface of the brake disk in a thickness direction.

When a cast iron material is casted, an outer portion of the brake disk, which is directly in contact with a mold, may be cooled relatively fast, and a central portion of the brake disk, which is far away from the mold, may be cooled relatively slowly. Because the growth sizes of the graphites are inversely proportional to a cooling rate, the sizes of eutectic cells at the outer portion may decrease, and the sizes of eutectic cells at the central portion may increase.

Because the sizes of the eutectic cells are inversely proportional to the number per unit area of the eutectic cells, the number per unit area of the eutectic cells may be reduced as the direction on the brake disk from an outer side to the central side of the cast iron material. Thus, when the friction surface of the brake disk formed of cast iron is ground, the number per unit area of the eutectic cells exposed to the friction surface may suitably be gradually reduced.

Thus, when the friction surface of the brake disk is ground in a thickness direction, as the number per unit area of the eutectic cells is reduced to about 300 ea/cm² or less, the judder phenomenon may be reduced.

An amount of grinding of the brake disk in the thickness direction thereof may vary depending on various conditions, and particularly, may be adjusted depending on a contraction ratio in the thickness direction during a casting process.

Figure 7:
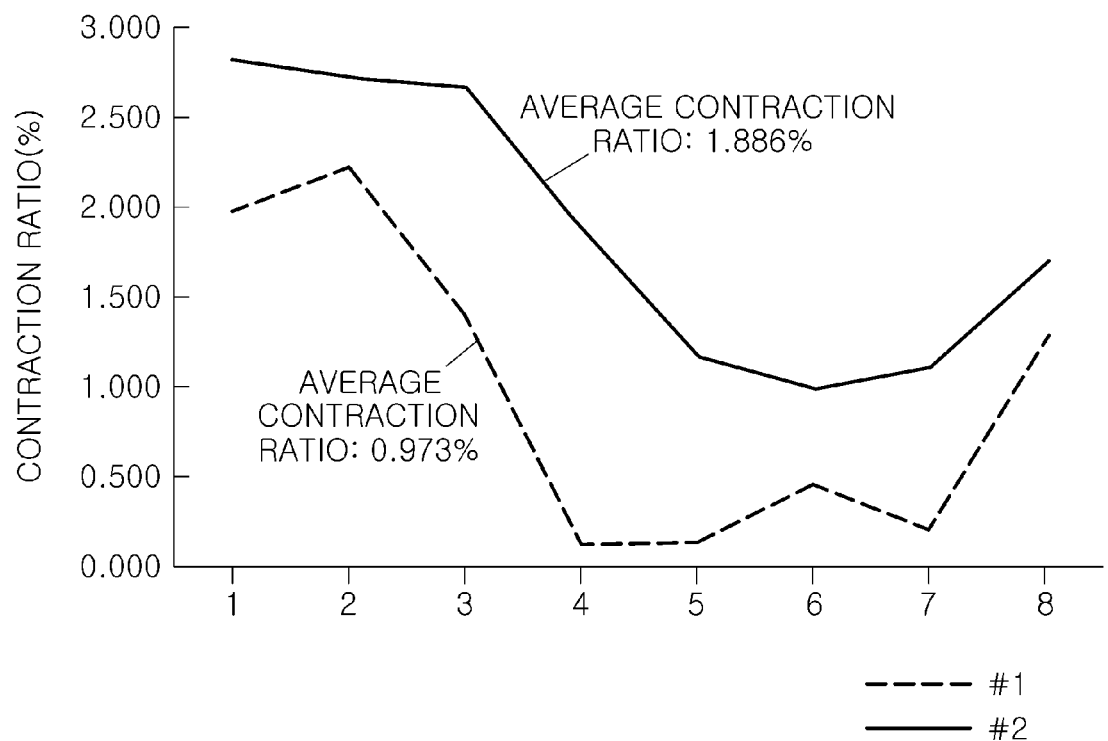
FIG. 7 is a graph depicting various contraction ratios of friction surfaces of exemplary brake disks manufactured according to an exemplary casting method.

FIG. 7 illustrates contraction ratios of two samples of brake disks having the same shape, which are casted in two kinds of casting methods, in thickness directions thereof. Numerals in a horizontal axis correspond to the divided sections illustrated in FIG. 6, an area 1 is a sample manufactured in a first casting method, and an area 2 means a sample manufactured in a second casting method. In the two casting methods, positions, sizes, shapes, and the like of feeder heads and overflows may be different from each other, but the shapes of resultant castings may be identical to each other. The detailed description thereof will be omitted because it departs from the scope of the present invention.

In both casting methods, molten metals formed of the same material may be inserted, the molten metals may be inoculated twice in a ladle and once in an injection stream, thus three times in total, and a cooling time may be 40 minutes or greater in each mold.

Although the shapes of final products manufactured by using the two casting methods are identical to each other, sample 1 had a contraction ratio that was less than about 1%, but sample 2 had a contraction ratio that is greater than about 1.5%. In this way, the contraction ratio of a casting may vary depending on a detailed configuration of a casting method.

Because a casting directly removed from a mold has an uneven surface, additional grinding may be required. In the related art, an amount of grinding has been determined to be inversely proportional to a contraction ratio of a friction surface.

For instance, an amount of grinding of sample 1 having a low contraction ratio may be increased, and an amount of grinding of sample #having a high contraction ratio may be decreased. As a result, the shapes of the castings injected from two molds were identical to each other. Accordingly, sample 1 was ground by about 2 to 2.5 mm in a thickness direction thereof, and sample 2 was ground by about 1.5 to 1.9 mm in a thickness direction thereof.

As illustrated in FIG. 8, in the case of sample 1 having a low contraction ratio, the number per unit area of eutectic cells was not greater than about 300 ea/cm², and a deviation of the eutectic cells was not greater than about 60 ea/cm². Thus, a friction coefficient was reduced and a deviation of the friction coefficient was reduced, so that the judder phenomenon may be minimized.

However, in the case of sample 2 having a high contraction ratio, the number per unit area of eutectic cells was greater than 300 ea/cm², and a deviation of the eutectic cells was greater than 60 ea/cm². Thus, a friction coefficient was increased and a deviation of the friction coefficient was increased, so that the judder phenomenon may occur more frequently.

Thus, in the present invention, an amount of grinding may be determined to be proportional to a contraction ratio, so that the number per unit area of eutectic cells formed on the friction surface of the brake disk may be adjusted to be about 300 ea/cm² or less.

In contrary to the related art, the amount of grinding of sample 1 may be set to be greater than the amount of grinding of sample 2, so that a eutectic cell having a larger size, which is located at the center of the casting, may be exposed to the friction surface.

Samples 3, 4, and 5 illustrated in FIG. 8 were manufactured in the same casting method as that of sample #2, and were then ground by different amounts of grinding in a thickness direction of one side of the brake disk. For example, sample 3 was ground by 2 mm, sample 4 was ground by 2.5 mm, and sample 5 was ground by 3 mm.

As a result, because sample 3 and sample 4 had the numbers of eutectic cells and the deviations, which were not greatly different from those of sample 2 above, a reduction in the judder phenomenon may not be expected. However, sample 5 has the number of eutectic cells and the deviation, which were greatly reduced, and thus, may be improved to a level that is similar to sample 1.

Accordingly, in order to adjust the number per unit area of eutectic cells to about 300 ea/cm² and adjust the deviation to about 60 ea/cm², when the contraction ratio of the brake disk in the thickness direction thereof is less than about 1.5% on average, the amount of grinding in the thickness direction of the one side may be adjusted to be not less than about 2 mm and be less than 3 mm. When the contraction ratio of the brake disk in the thickness direction thereof is not less than about 1.5% on average, the amount of grinding in the thickness direction of the one side may be adjusted to be not less than about 3 mm.

Even when the contraction ratio of the brake disk in the thickness direction thereof is reduced, a portion of the brake disk, which is directly in contact with the mold, may be grounded in order to arrange the shape of the surface of the casting and remove sections of small eutectic cells formed on the surface of the casting, such that the number per unit area of the eutectic cells may be reduced.

Thus, regardless of the contraction ratio of the brake disk, the friction surface on the one side of the brake disk may be ground by at least about 2 mm or greater, preferably by about 2.5 mm or greater.

When the contraction ratio of the brake disk in the thickness direction thereof is less than about 1.5%, an amount of grinding of the friction surface on the one side of the brake disk may be about 3 mm or less, because, even when the friction surface is ground by about 3 mm or greater, the number per unit area of the eutectic cells may not be greatly reduced.

Meanwhile, when the contraction ratio of the brake disk in the thickness direction thereof is not less than about 1.5%, the friction surface on the one side of the brake disk may be ground by about 3 mm or greater. When the amount of grinding is less than about 3 mm, as in samples 2, 3, and 4 illustrated in FIG. 8, the number per unit area of the eutectic cells may increase, and the deviation thereof also may increase. Thus, an objective of the present invention to reduce the judder phenomenon may not be achieved.

Table 1 represents a result obtained by measuring maximum BTVs of samples having different numbers per unit area of eutectic cells under various conditions, for example, when while an initial speed and a brake torque vary. The unit of the maximum BTV is kgf which is the same as the brake torque.

As illustrated in FIG. 8 and represented in Table 1, an average value of the maximum BTVs of sample 1 and sample 5, in which the number per unit area of the eutectic cells were not greater than about 300 ea/cm$^2$ and the deviation thereof was not greater than about 60 ea/cm$^2$, was less than sample 4. On the other hand, an average value of the maximum BTVs of samples 2, 3, and 4, in which the number per unit area of the eutectic cells were greater than about 300 ea/cm$^2$ and the deviation thereof were greater than about 60 ea/cm$^2$, was not less than 6, but up to 9 or greater.

In this way, when the maximum BTV is high, because the judder phenomenon severely may occur during braking, comfort of a passenger may deteriorate sharply.

Thus, in order to reduce the judder phenomenon during braking, the number per unit area of the eutectic cells and the deviation thereof may be limited as described above.

TABLE 1

| Initial speed (km/h) | Brake torque (kgf) | #1 | #2 | max BTV #3 | #4 | #5 |
|---|---|---|---|---|---|---|
|  | 17.8 | 3.607 | 5.963 | 5.938 | 5.337 | 2.155 |
|  | 35.5 | 4.355 | 8.7 | 7.674 | 7.39 | 3.324 |
| 50 | 53.3 | 2.639 | 9.971 | 10.332 | 8.143 | 3.695 |
|  | 71 | 2.268 | 9.541 | 11.496 | 9.541 | 4.614 |
|  | 88.8 | 2.933 | 5.474 | 9.971 | 8.407 | 4.497 |
|  | Average | 3.16 | 7.93 | 9.082 | 7.764 | 3.657 |
|  | 17.8 | 2.737 | 5.122 | 5.367 | 3.861 | 1.32 |
|  | 35.5 | 2.463 | 7.429 | 6.774 | 6.51 | 2.395 |
| 100 | 53.3 | 2.17 | 9.501 | 9.736 | 8.152 | 2.991 |
|  | 71 | 2.19 | 8.759 | 10.557 | 8.211 | 4.379 |
|  | 88.8 | 2.542 | 8.211 | 10.264 | 6.843 | 5.474 |
|  | Average | 2.42 | 7.804 | 8.54 | 6.715 | 3.312 |
|  | 17.8 | 2.796 | 7.634 | 6.774 | 3.333 | 2.151 |
|  | 35.5 | 2.796 | 7.849 | 7.957 | 9.14 | 3.011 |
| 130 | 53.3 | 3.011 | 9.462 | 9.892 | 7.419 | 3.011 |
|  | 71 | 3.226 | 8.71 | 10.538 | 7.312 | 4.086 |
|  | 88.8 | 2.903 | 6.559 | 8.925 | 5.591 | 5.161 |
|  | Average | 2.946 | 8.043 | 8.817 | 6.559 | 3.484 |

Although the embodiments of the present invention have been described with reference to the accompanying drawings, it can be understood by those skilled in the art to which the present invention pertains that the present invention may be implemented in other specific forms without changing the technical spirit or the essential feature of the present invention.

Therefore, it should be understood that the above-described embodiments are not restrictive but illustrative in all aspects. The scope of the present invention is defined not by the detailed description but by the appended claims, and it should be interpreted that the meaning and the range of the appended claims, and all changes or changed forms derived from an equivalent thereof are included in the scope of the present invention.

What is claimed is:

1. A method of manufacturing a brake disk, comprising:
   casting a brake disk comprising a friction surface; and
   grinding the friction surface of the brake disk in a thickness direction such that a number per unit area of eutectic cells formed on the friction surface of the brake disk is not greater than about 300 ea/cm$^2$, and a deviation of the number per unit area of the eutectic cells formed in sections of the brake disk is not greater than about 60 ea/cm$^2$.

2. The method of claim 1, wherein in the grinding of the friction surface of the brake disk in the thickness direction, when an average contraction ratio at which the brake disk is contracted in the thickness direction while the brake disk is casted is less than about 1.5%, one side of the friction surface is ground by a degree that is not less than about 2 mm and is less than 3 mm.

3. The method of claim 1, wherein in the grinding of the friction surface of the brake disk in the thickness direction, when an average contraction ratio at which the brake disk is contracted in the thickness direction while the brake disk is casted is not less than about 1.5%, one side of the friction surface is ground by about 3 mm or greater.

* * * * *